United States Patent [19]
Leleve

[11] Patent Number: 4,977,360
[45] Date of Patent: Dec. 11, 1990

[54] METHOD AND CIRCUIT FOR CONTROLLING A POSITION-CONTROLLING DC MOTOR AND A SYSTEM FOR CONTROLLING LINEAR DISPLACEMENT IN ACCORDANCE WITH THE METHOD

[75] Inventor: Joël Leleve, Epinay-Sur-Seine, France

[73] Assignee: Cibie Projecteurs, Bobigny, France

[21] Appl. No.: 233,913

[22] Filed: Aug. 16, 1988

Related U.S. Application Data

[63] Continuation of Ser. No. 813,616, Dec. 26, 1985, abandoned.

[30] Foreign Application Priority Data

Dec. 26, 1984 [FR] France ................. 84 19804

[51] Int. Cl.⁵ .................................... G05B 11/06
[52] U.S. Cl. ................................ 318/596; 318/626
[58] Field of Search ............. 318/560, 596, 599, 626, 318/663

[56] References Cited

U.S. PATENT DOCUMENTS

| | | | |
|---|---|---|---|
| 3,639,824 | 2/1972 | Malavasi | 318/599 |
| 3,743,911 | 7/1973 | Erler | 318/599 |
| 3,745,420 | 7/1973 | Hafner | 318/599 X |
| 3,936,715 | 2/1976 | Nixon | 318/599 X |
| 3,958,131 | 5/1976 | Mozdzer | 318/599 X |
| 4,112,342 | 9/1978 | Elliot | 318/599 |
| 4,146,828 | 3/1979 | Ross | 318/599 |
| 4,177,412 | 12/1979 | Minakuchi | 318/341 |
| 4,259,627 | 3/1981 | Matsuno | 318/626 X |
| 4,288,730 | 9/1981 | Graham | 318/599 |
| 4,295,082 | 10/1981 | Moto et al. | 318/596 X |
| 4,300,081 | 11/1981 | Van Landingham | 318/599 |
| 4,328,451 | 5/1982 | Barge | 318/596 |
| 4,442,390 | 4/1984 | Davis | 318/9 X |
| 4,546,296 | 10/1985 | Washbourn | 318/372 |
| 4,546,297 | 10/1985 | Washbourn | 318/372 |
| 4,546,298 | 10/1985 | Wickham | 318/372 |
| 4,571,530 | 2/1986 | Sweeney | 318/599 |

FOREIGN PATENT DOCUMENTS 3021063 10/1981 Fed. Rep. of Germany .
1369512 2/1963 France .
2540647 2/1983 France .

OTHER PUBLICATIONS

Electrical Design News, vol. 28, No. 10, May 1983, pp. 195–206, Boston, Mass., U.S., J. Williams et al., "Use Motor-Drive IC to Solve Tricky Design Problems", (FIG. 5).

Paul Horowitz and Winfield Hill, "The Art of Electronics", Cambridge University Press, 1980, pp. 162–163.

Primary Examiner—Bentsu Ro

[57] ABSTRACT

The present invention is drawn towards a method and a circuit for controlling a position-controlling DC motor, a system for controlling DC motor, and a system for controlling linear displacement in accordance with the method. The motor (3) has a shaft and is controlled in accordance with an error signal ($\epsilon$) by generating a sequence of variable duty ratio pulses on the basis of the error signal, thereby controlling the motor. The mean value of the pulses is proportional to the difference between the instantaneous position of the motor shaft and a desired or set position at which the motor shaft should stop. Such apparatus may be used to control the orientation of a headlamp and/or an antenna.

8 Claims, 5 Drawing Sheets

METHOD AND CIRCUIT FOR CONTROLLING A POSITION-CONTROLLING DC MOTOR AND A SYSTEM FOR CONTROLLING LINEAR DISPLACEMENT IN ACCORDANCE WITH THE METHOD

This application is a continuation of application Ser. No. 06/813,616, filed on Dec. 26, 1985, now abandoned.

The present invention relates to a method of controlling a position servocontrol DC motor, to a control circuit using the method, and to a system for controlling linear displacement in accordance with the same method.

BACKGROUND OF THE INVENTION

Numerous publications, and in particular patents, already describe the control of DC motors, and in particular the control of low voltage DC motors of the kind used in components for motor cars. For example, French patent application No. 83 01748 describes clutch position control in which a moving component is displaced under the control of pulses at a recurrence frequency which is a function of the speed of the motor. French patent No. 1 369 512 relates to a system in which the rate and the width of the pulses may change as a function of an error voltage such as a speed error, thereby producing speed feedback.

However, the above-mentioned devices are nevertheless subject to the constraints which are specific to using DC motors of the kind generally used when providing position control, and these constraints are described below with reference to FIGS. 1 and 2, which show the conventional solutions generally employed with motors of this type. The electric motors generally used for this kind of position control have high torque and a high speed of rotation.

Electronic control for a servomotor is generally provided either in proportional mode or else in on/off mode.

In proportional mode as shown in FIGS. 1a and 1b, the voltage delivered to the motor 3 is inversely proportional to the error $\epsilon$ between the instantaneous position of the motor shaft (as given, for example, by a position-indicating system r) and the desired final position of the shaft as represented by a reference signal c. The voltage applied to the motor 3 is generated by means of a subtractor circuit 1, and where necessary, by means of an amplifier circuit 2. FIG. 1b shows that the voltage effectively applied to the motor falls off with travel of the motor shaft and ends at a threshold voltage marked $V_{th}$.

Proportional mode control gives good accuracy in the position in which the shaft stops, and it also stops the shaft gently. However, it suffers from the drawbacks of poor efficiency due to the electrical power dissipated in the electronic circuits, and above all due to the existence of a permanent current flowing through the motor when it is in its stopped position, which current is due to the motor threshold voltage and gives rise to permanent dissipation in the control circuits. This phenomenon runs the risk of the equipment overheating and of protective means disconnecting the hot circuits.

In on/off control mode, as shown in FIGS. 2a and 2b, the reference or control voltage or signal c is applied to one of the inputs to the subtractor 1 and causes an error voltage $\epsilon$ to appear on the output thereof, which error voltage is suitable, in turn, for triggering a generator 4 which delivers a DC voltage directly to the motor. The voltage $V_{motor}$ applied to the motor then changes suddenly from maximum to zero when the instantaneous position of the motor shaft as represented by the position-indicating signal r approaches the desired position. FIG. 2b plots the voltage actually applied to the motor and the travel of its shaft as substantially represented by the signal r as a function of time.

Unlike proportional mode control, on/off mode control has the advantage of avoiding any risk of over-heating and consequent disconnection since no current flows through the motor when it is in its stop position. However the accuracy of the position in which the motor stops, and thus the accuracy of the position controlled thereby, is less good than in proportional mode and the sudden and staccato operation gives rise to a risk in position instability (often called "hunting") particularly when it is desired for the positioning error relative to the desired stop position to be compatible with the usual requirements in this kind of application.

Preferred embodiments of the present invention remedy the above drawbacks by providing a control method, a control device, and a system for controlling linear displacement of a DC motor, in which the drawbacks of proportional mode control and of on/off mode control are eliminated.

SUMMARY OF THE INVENTION

The present invention provides a method of controlling a DC motor in a position servocontrol loop, in which a position error signal is used to control the motor, said motor being controlled by a sequence of variable duty ratio pulses with the mean value of said pulses being substantially proportional to the difference between the instantaneous position of the motor shaft and the set stop position thereof.

The DC motor control device in accordance with the invention comprises, in the direct motor control chain, means for generating a sequence of variable duty ratio pulses for directly controlling the motor on the basis of the error signal. The pulses delivered by the generator means have a mean value which is proportional to the difference between the instantaneous position of the motor shaft and the set stop position thereof.

The invention is applicable in the motor industry, in particular for controlling the direction in which car headlamps point. The invention is also applicable to any other field in which a headlamp or a headlamp reflector is to be pointed with a high degree of accuracy, and in particular, it is applicable to space applications for pointing antennas or antenna reflectors on artificial satellites.

BRIEF DESCRIPTION OF THE DRAWINGS

Embodiments of the invention are described by way of example with reference to the accompanying drawings, in which.

MORE DETAILED DESCRIPTION

Figure 1:
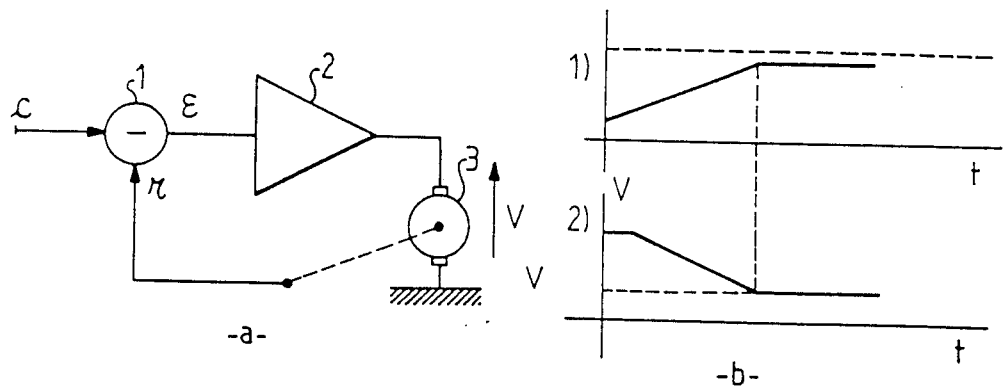
FIGS. 1 and 2 relate to the prior art and have already been described.
Figure 2:
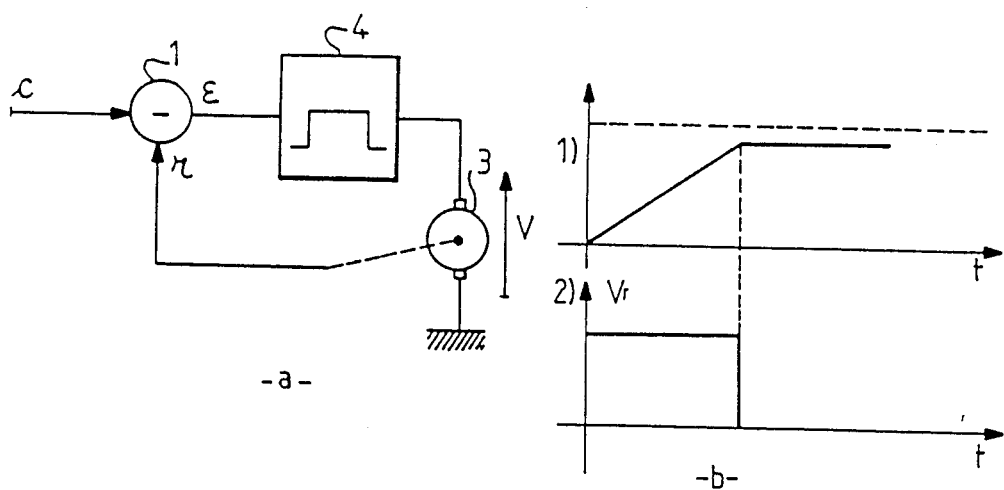
Figure 3A:
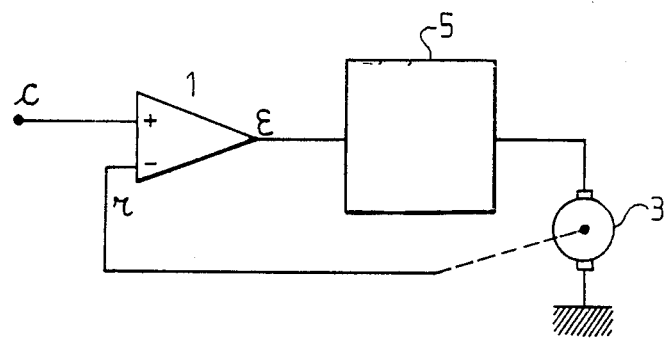
FIGS. 3a and 3b are respectively a block diagram of a control device in accordance with the invention and a pair of graphs showing the travel of the motor shaft and the control signals applied to the motor.
Figure 3B:
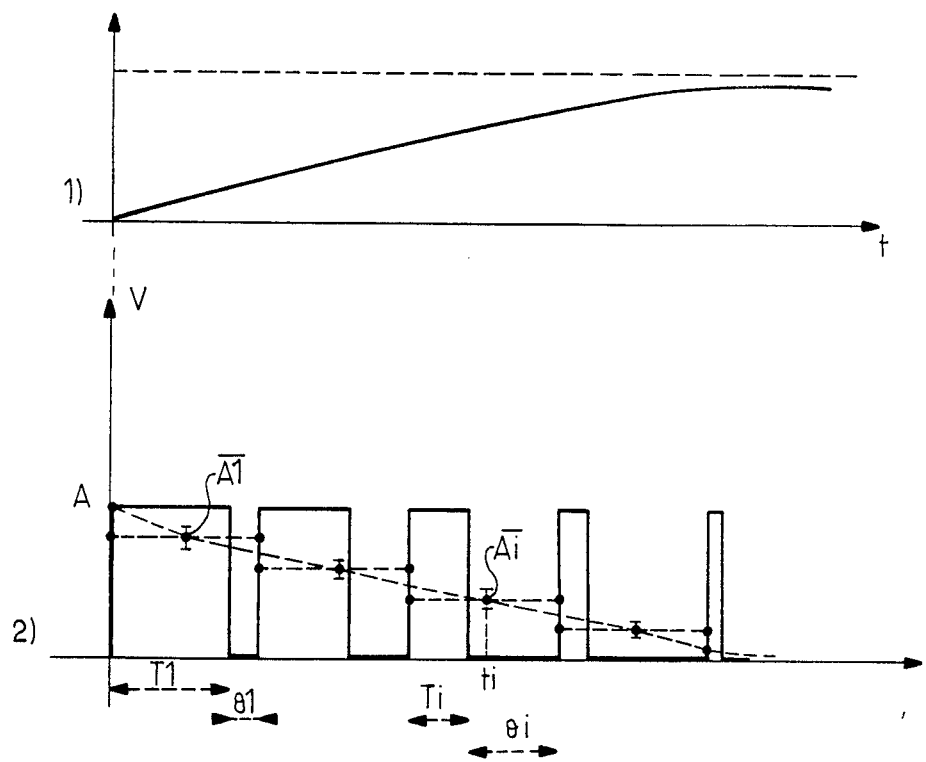

The method of controlling a DC motor in a position servocontrol loop is now described with reference to FIGS. 3a and 3b. In FIG. 3a, the position error signal is generated by a subtractor 1 on the basis of a reference or position-setting signal and of a position signal r representative of the position of the shaft of a motor 3. In FIG. 3a, the position-indicating system is represented by a mechanical connection marked as a dashed line and could be embodied, for example, by means for controlling a potentiometer. The motor 3 is controlled by a sequence of variable duty ratio pulses such that the mean value of the pulses is substantially proportional to the difference between the instantaneous position of the motor shaft and the stop position of the motor shaft as set by the control signal c. The instantaneous position of the motor shaft is given by the signal r and the set position is given by the control signal c. The variable duty ratio pulses are delivered by a pulse generator 5 which has one input connected to receive the error or difference signal $\epsilon$ and which has an output terminal on which it delivers the pulses which are applied to one of the terminals of the motor armature Thus, as can be seen in FIG. 3b(2), the duration Ti of the i-th pulse is proportional to the value of the error signal $\epsilon$ at that time. By way of example, the control pulses are shown as being of equal amplitude. The time interval between two successive pulses (where time interval $\Theta i$ exists between the i-th and (i+1)-th pulses) is inversely proportional to the average voltage applied to the motor 3. Preferably, successive pulses are at the same recurrence frequency. Thus, as shown in FIG. 3b(2) (in which the time scale is greatly expanded in order to clarify the description of the waveform effectively applied as a control signal to the motor), points $\overline{A}_i$ are plotted at an amplitude value which is equal to the mean value of the i-th pulse, and at instants $t_i$ located in the middle of each i-th recurrence. These points substantially reconstitute the form of the voltage applied to the motor 3 when proportional mode control is used as shown in FIG. 1b(2). However, the voltage actually applied to the motor at any specific moment is constituted by a sequence of on/off pulses, thereby enabling the control method of the invention to benefit from the advantages both of proportional control and of on/off control, while avoiding their respective drawbacks. It can readily be seen that, to begin with, the motor is operating at high speed almost as though a continuous maximum voltage were being applied thereto under proportional control with continuous operation. This is because the motor effectively integrates the pulses. In contrast, when the speed falls off, the mode of operation changes and reaches a condition in which the motor repeatedly stops and starts, where for each start, it provides its maximum couple while displacing its shaft relatively little.

A particular embodiment of the variable duty ratio pulse generator means is now described with reference to FIG. 4. These pulse generator means are preferably constituted by a relaxation type oscillator capable of delivering a sequence of variable duty ratio pulses such that the duration of each pulse is proportional to the value of the error signal, with the time interval between two successive pulses being inversely proportional to the mean voltage applied to the motor. A particularly suitable type of oscillator comprises a comparator 50 having a positive input connected to receive the error signal $\epsilon$ and a negative input connected to a capacitance 51 capable of generating relaxation oscillations by successive charging and discharging. A positive feedback loop 53 from the output of the comparator 50 to its positive input serves to weight the time interval between two successive pulses inversely relative to the mean voltage applied to the motor, and a negative feedback loop 52 from the output of the comparator 50 to its negative input serves to weight the duration of each pulse as a function of the error signal value. By way of example, the comparator 50 may be constituted by an operational amplifier In FIG. 4, the terminal of the capacitor 51 which is not connected to the negative input of the comparator has been drawn as being connected to circuit ground. Because of the slowly varying nature of the error signal $\epsilon$ relative to the charging and discharging time constants of the capacitor 51 and associated circuits, this capacitor terminal could equally well be connected to the input terminal for the error signal $\epsilon$, thereby simplifying practical circuit design. The positive and negative feedback circuits 53 and 52 are constituted by resistors.

A preferred embodiment of a control device suitable for forward and reverse control of a DC motor in accordance with the invention is now described with reference to the circuit diagram of FIG. 5a and with reference to the waveform diagrams of FIG. 5b.

The device comprises a first control chain comprising a first comparator $CI_1$ suitable for generating a first error signal $\epsilon_1$ relative to a reference c connected in series with a second comparator $CI_2$ operating as a variable duty ratio oscillator and having its output directly connected to one of the terminals of the motor armature. The second control chain is similarly constituted by a third comparator $CI_3$ suitable for generating a second error signal $\epsilon_2$ relative to the same reference signal c and connected in series with a fourth comparator $CI_4$ operating as a variable duty ratio oscillator and having its output directly connected to the other terminal of the motor armature. A power supply circuit $D_1$, $C_1$ supplies power to the circuit as a whole in the form of a determined DC voltage Vcc. When used to control vehicle headlamps, the voltage Vcc may be the vehicle battery voltage, e.g. 12 volts. A bias circuit, represented in FIG. 5a by resistors $R_4$, $R_5$, and $R_6$ serves to generate a DC voltage at substantially half the supply voltage. This bias voltage is delivered to the negative input of the first comparator and to the positive input of the third comparator. A position-indicating circuit is represented in FIG. 5a by a potentiometer $P_1$ mechanically connected to the motor 3 by a link that is symbolized by a dot-dashed line. The potentiometer $P_1$ delivers a signal representative of the position of the motor shaft to the positive input of the first comparator and to the negative input of the third comparator. Waveform diagrams A, B, C, D, E, and F shown in FIG. 5b serve to explain the operation of the above-described circuit.

The reference signal c as applied at A, is in the form of a negative-going step from a stable value, followed by a positive going return to said stable value. The control signal c may take any value lying in the range zero volts to 12 volts. The position-representing signal $\epsilon$ taken from point B is applied to the positive input of the first comparator and to the negative input of the third comparator. The phase during which the position-indicating signal r falls to follow the downward step in the control signal r gives rise to an error signal $\epsilon_1$ at C at the output from the comparator $CI_1$ and simultaneously gives rise to a series of variable duty ratio pulses at D, i.e. the output from the comparator $CI_2$, which pulses are applied to the motor and cause it to rotate in a first direction. Once the motor has reached its equilibrium position, the position-indicating signal r reaches a static phase represented by a horizontal line in waveform diagram B, and no pulses are applied to the motor as represented by the horizontal line in waveform D. When the reference signal c then changes, e.g. to return to its original value, an error signal $\epsilon_2$ appears at the output from the third comparator $CI_3$, and as a consequence variable duty ratio pulses appear at F, i.e. at the output from the fourth comparator $CI_4$, which pulses are applied to the motor 3 in such a manner as to cause it to rotate in the opposite direction so that it returns to its initial position. In order to ensure that the motor stops in substantially the desired position and draws no further power so long as that position remains the desired position, a low value resistance $R_5$ is inserted in the middle of the potential divider which is mainly constituted by the resistors $R_4$ and $R_6$ which are adapted to generate a bias voltage substantially one-half the power supply voltage. Resistor $R_5$ ensures a degree of hysteresis in motor control by providing a hysteresis threshold for the error voltage. It will be understood that once the motor has reached the desired stop position, residual uncertainties in the position of the motor and in the convertions performed by the various transducers used to provide the position-indicating signal being neglected, that any error signal less than some threshold value has no significance. The circuit described ensures that values of the error signal smaller than the threshold value will leave the outputs of both the first and the third comparators $CI_1$ and $CI_3$ at zero, thereby turning off both of the relaxation oscillators constituted by the second and fourth comparators $CI_2$ and $CI_4$.

Figure 4:
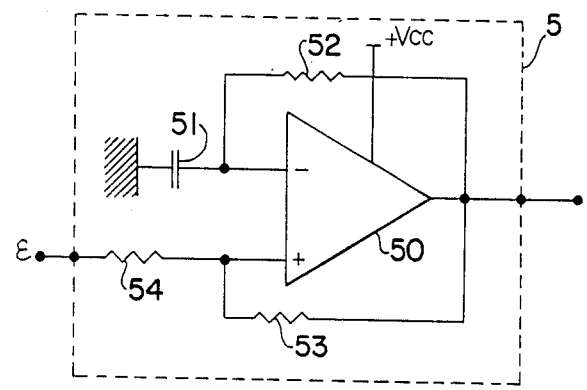
FIG. 4 is a circuit diagram of a pulse generator capable of delivering pulses having a variable duty ratio.
Figure 5A:
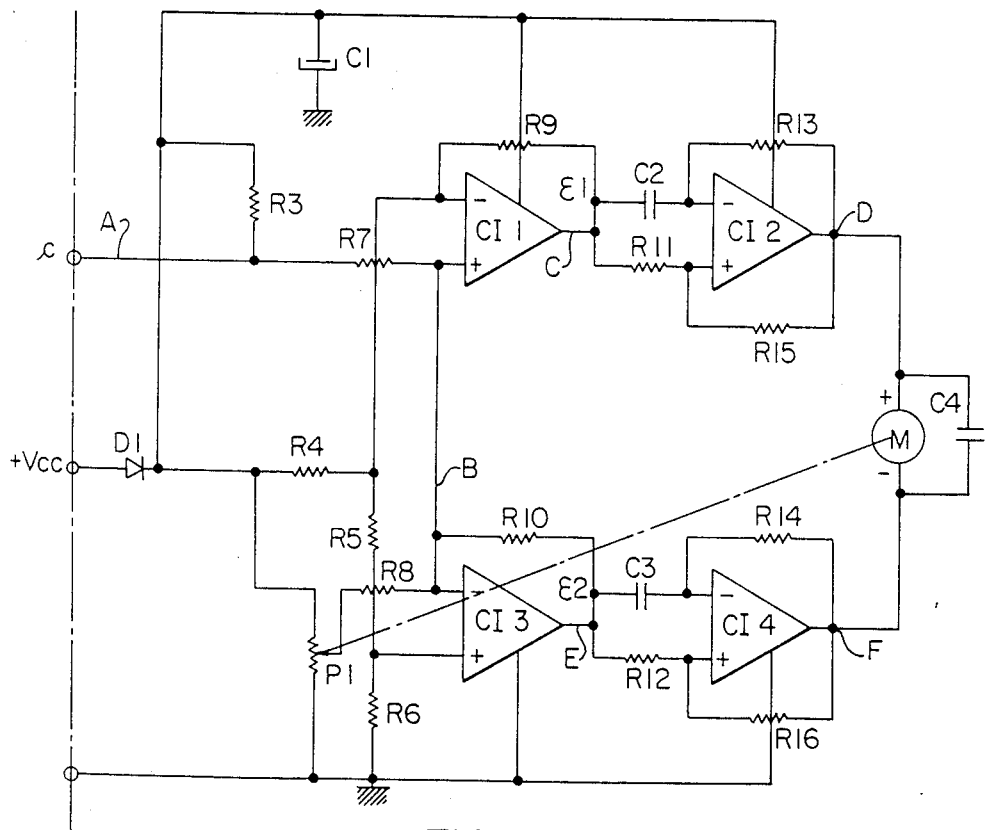
FIG. 5a is a circuit diagram of a preferred embodiment of a control system in accordance with the invention, said embodiment being particularly suitable for controlling forward and reverse position of a motor.
Figure 5B:
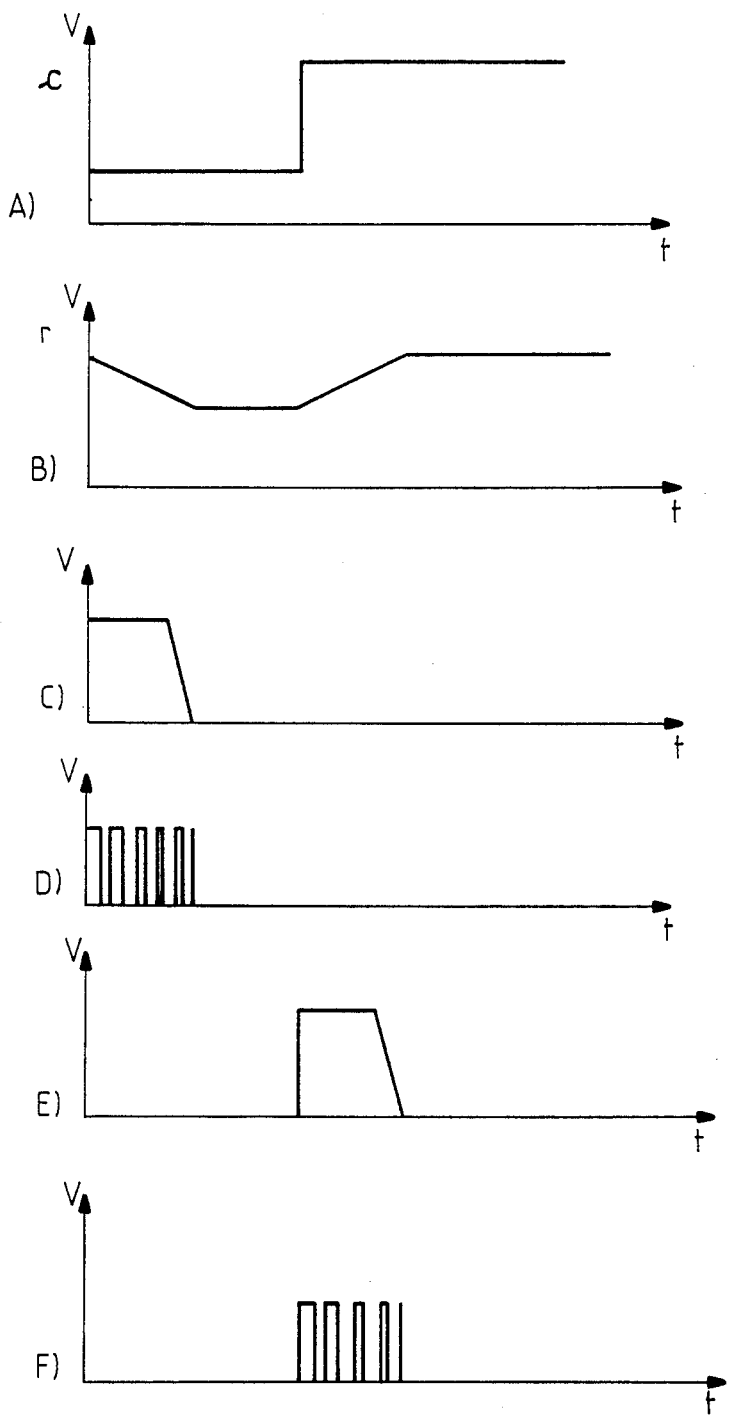
FIG. 5b is a set of waveform diagrams relating to various test points in the FIG. 5a circuit.

Finally, it should be mentioned that in the circuit diagram of FIG. 5a, resistors marked $R_{13}$, $R_{14}$, and $R_{15}$, $R_{16}$ act respectively as positive and as negative feedback circuits such as the resistors 52 and 53 of the relaxation oscillator shown in FIG. 4.

In order to take full advantage of the control accuracy which the above-described control device is capable of providing, it has been necessary to provide a correspondingly accurate mechanical system capable of performing said accuracy. This mechanical system is preferably as described below with reference to FIGS. 6 and 7 which relate to the case of a system for accurately controlling linear displacement.

Figure 6:
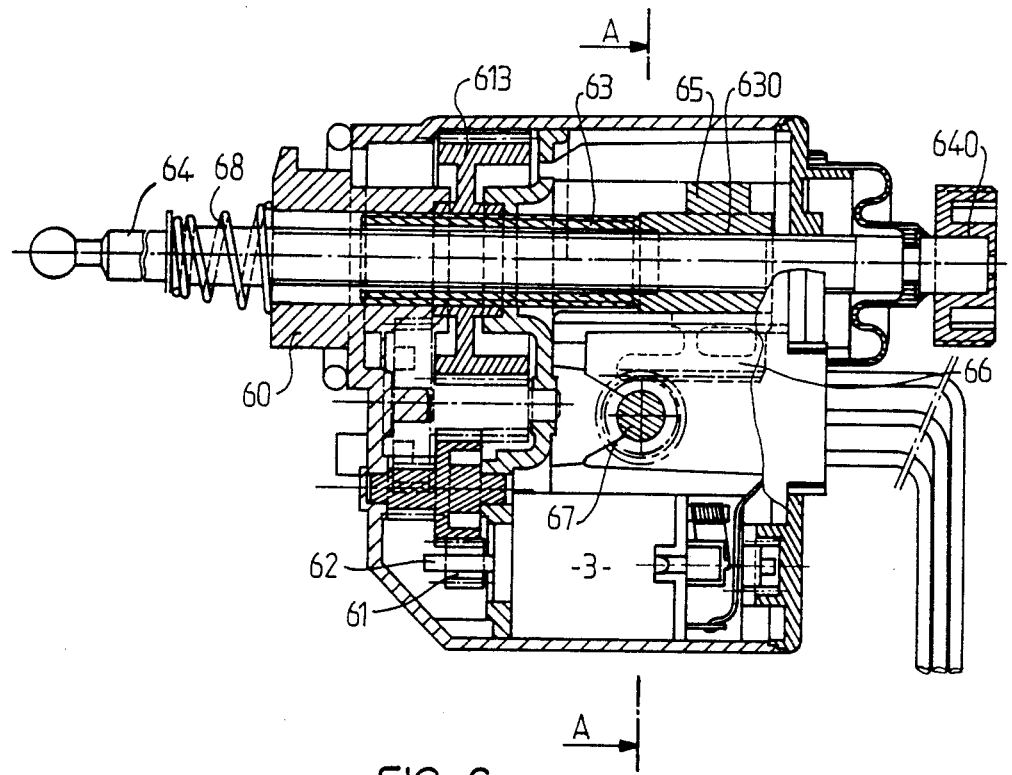
FIG. 6 is a longitudinal section through a complete high accuracy linear displacement controlling system in accordance with the invention.
Figure 7:
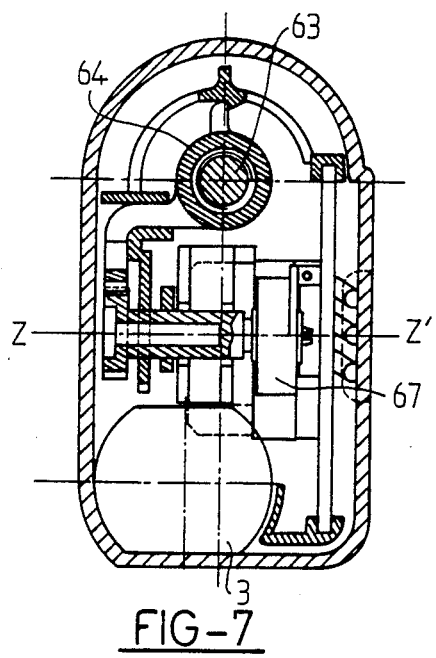
FIG. 7 is a cross-section through the control system shown in FIG. 6, on a plane A—A.

In FIG. 6, the system naturally includes a DC motor 3 which is controlled in accordance with the method of the invention. The system comprises a body 60 housing a gear train 61 which meshes with the motor shaft 62 and is suitable for transmitting motor shaft rotation with a predetermined stepdown ratio. One of the gear wheels in said gear train is referenced 613 in FIG. 6 and is fixed to rotate with a sleeve 63 about an axis $\Delta$ which extends parallel to the direction in which linear displacement is to be controlled. The sleeve 63 is also fixed so that it does not move in translation in said direction of linear displacement relative to the body 60. A linear displacement control rod 64 is screwed into the sleeve 63 and is driven in linear displacement by the sleeve 63 when the sleeve rotates. The system body 60 and the sleeve 63 may be made of molded plastics material, for example, while the control rod 64 is preferably a metal rod. The outside of the sleeve 63 includes a toothed wheel, or the like, which meshes with a transmission 66. The transmission 66 is mounted in such a manner as to rotate the axis of a potentiometer 67 which constitutes the position-sensing potentiometer for indicating the position of the shaft of the motor 3. Thus, and as can be seen more clearly in FIG. 7 which is a cross-section view on a plane A-A of FIG. 6, the axis of rotation of the position-sensing potentiometer 67 is orthogonal to the direction $\Delta$ in which linear displacement is controlled. The sleeve has a tapped zone 630 on its inside wall and the linear displacement control rod 64 is screwed into said tapped zone. It may be observed in FIG. 6 that the tapped zone 630 does not extend over the entire inside surface of the sleeve, and is located only at one end thereof. In addition, the tapped zone 630 may be disposed substantially symmetrically about the section plane A-A, which plane is orthogonal to the linear displacement control direction and includes the axis of rotation of the position-sensing potentiometer 67. This specific disposition minimizes temperature variation effects which could cause spurious variations in the position of the position-sensing potentiometer. This is because there is substantially complete compensation of variations due to expansion of the sleeve by virtue of the symmetry of the above-described structure about the potentiometer axis. Naturally the length of the tapped zone 630 could be reduced to the minimum compatible with ensuring adequate transmission of linear translation motion to the control rod 64 without generating substantial changes in size of said tapped zone due to changes in temperature. In any case, the linear expansion coefficients of the materials constituting the sleeve and the rod, mainly plastic and metal respectively, are chosen to be at a ratio of ten to one, with the rod being constituted, for example, by a steel having linear expansion coefficient $\lambda = 1.2 \times 10^{-5}$ °C.$^{-1}$ (relative values).

Further, the control rod 64 has a cold control knob 640 disposed at its non-active end to enable the rod 64 to be screwed into the sleeve so as to adjust its origin position. Finally, the rod 64 has a slack take-up spring 68 acting between a collar on the rod and the body 60 of the system.

The above description concerns a method and a control circuit for a DC motor, and a system for accurately controlling linear displacement using said method and said circuit. The above-described system has led to linear displacement actuators being developed capable of ensuring an accuracy of 5 hundredths of a millimeter over a total stroke of ten millimeters. Temperature tests on such actuators have shown that they behave well over an operating temperature range of $-30°$ C. to $+80°$ C.

I claim:

1. A circuit for controlling a DC motor in a position control loop and capable of providing forward and reverse control of said motor, wherein said motor having a shaft and an armature with two terminals, the circuit comprising:

a first control chain comprising a first comparator capable of generating a first error signal relative to a reference signal and connected in series with a second comparator operating as a variable duty ratio oscillator for generating pulses having a means value which is proportional to the difference between the instantaneous position of the motor shaft and a reference or set stop position thereof and having its output directly connected to one terminal of the motor armature;

a second control chain comprising a third comparator capable of generating a second error signal relative to said reference signal and connected in series with a fourth comparator operating as a variable duty ratio oscillator for generating pulses having a mean value which is proportional to the difference between the instantaneous position of the motor shaft and the reference or set stop position thereof and having its output directly connected to the other terminal of the motor armature;

a power supply circuit for providing a predetermined DC voltage and a bias voltage substantially equal to one-half of said DC voltage, said bias voltage being delivered to the negative input of the first comparator and to the positive input of the third comparator; and a position-sensing circuit for sensing the position of the motor shaft and connected to deliver a signal representative of the position of the motor shaft to the positive input of the first comparator and to the negative input of the third comparator.

2. A system for controlling linear displacement of a control rod, said system comprising:

a DC motor having a motor shaft controlled by means of a sequence of variable duty ratio pulses;

circuit means located in a motor control chain for generating said sequence of variable duty ratio pulses, said pulses having a mean value which is proportional to the difference between an instantaneous position of the motor shaft and a reference or set stop position thereof;

a body;

a gear train meshing with said motor shaft and suitable for transmitting rotation of said motor shaft at a predetermined step-down ratio;

a sleeve fixed to rotate with one gear wheel in said gear train, said sleeve being rotatable about an axis which is parallel to the direction of the linear displacement of said control rod and fixed in translation along said direction relative to said body, said sleeve having a toothed wheel mounted on the outside thereof and meshing with a transmission which is mounted to rotate the axis of a potentiometer, said potentiometer generating a signal representative of the position of said motor shaft, the axis of rotation of said potentiometer being orthogonal to the direction of the linear displacement of the control rod; and said linear displacement control rod screwed into said sleeve and driven in linear displacement by the sleeve when the sleeve rotates.

3. A system according to claim 2, wherein said sleeve includes a tapped zone on its inside wall, said linear displacement control rod being screwed into said tapped zone, said tapped zone being disposed substantially parallel to a plane which is orthogonal to the direction of linear displacement of said control rod and which contains the axis of rotation of said potentiometer.

4. A system for controlling linear displacement of a control rod comprising a circuit for controlling a DC motor having a position servocontrol loop in which a position error signal is used to control the motor, said circuit comprising pulse generating means located in the loop for generating a sequence of variable duty ratio pulses adapted, on the basis of said position error signal, to directly control the motor, the pulses delivered by said pulse generating means having a means value which is proportional to the difference between an instantaneous position of a motor shaft and a reference or set stop position thereof, a body, a gear train meshing with the motor shaft and adapted to transmit rotation of the motor shaft at a predetermined step down ratio, a sleeve fixed to rotate with a gear wheel in said gear train, said sleeve being rotatable about an axis which is parallel to the direction of the linear displacement of the control rod and being fixed in translation along said direction relative to said body, and said linear displacement control rod screwed into said sleeve and driven in said direction of linear displacement by the sleeve when the sleeve rotates.

5. A system according to claim 4, wherein said control rod has a first end whose position is controlled in said linear displacement, and has an opposite second end including a knurled knob enabling said control rod to be screwed into said sleeve in order to adjust the position of said control rod.

6. A system according to claim 4 wherein said control rod includes a first end whose position is controlled in said linear displacement, and wherein a spring is disposed to act between said first end of the control rod and the body of the system in order to take up slack.

7. A circuit for controlling a DC motor in a position servocontrol loop in which a position error signal is used to control the motor, said motor having a shaft and an armature with two terminals, said circuit comprising pulse generating means located in a motor control chain for generating a sequence of variable duty ratio pulses adapted, on the basis of said position error signal, to directly control the motor, the pulses delivered by said pulse generating means having a means value which is proportional to the difference between an instantaneous position of the motor shaft and a reference or set stop position thereof, wherein said pulse generating means includes a plurality of comparators configured as relaxation oscillators receiving said position error signal and having their outputs directly connected to one terminal of the motor armature for delivering a sequence of pulses in which said duty ratio varies such that the duration of each pulse is proportional to the value of said position error signal, with the off time between two successive pulses being inversely proportional to the value of said position error signal.

8. A circuit for controlling a DC motor in a position servocontrol loop in which a position error signal is used to control the motor, said motor having a shaft and an armature with two terminals, said circuit comprising pulse generating means located in a motor control chain for generating a sequence of variable duty ratio pulses adapted, on the basis of said position error signal, to directly control the motor, the pulses delivered by said pulse generating means having a mean value which is proportional to the difference between an instantaneous position of the motor shaft and a reference or set stop position thereof, wherein said pulse generating means includes a plurality of relaxation oscillators each comprising comparator means and positive and negative feedback means connected to the comparator means, said relaxation oscillators receiving said position error signal and having their outputs connected to one terminal of the motor armature for delivering a sequence of pulses in which the duty ratio varies in proportion to the value of said position error signal, with the off time between two successive pulses being inversely proportional to the value of said position error signal.

* * * * *